(12) United States Patent
Dodge

(10) Patent No.: US 7,937,454 B2
(45) Date of Patent: May 3, 2011

(54) WIRELESS MEDIA SYSTEM WITH EMBEDDED MEDIA SERVER

(75) Inventor: Andrew John Dodge, San Jose, CA (US)

(73) Assignee: NXP B.V., Eindhoven (NL)

( * ) Notice: Subject to any disclaimer, the term of this patent is extended or adjusted under 35 U.S.C. 154(b) by 196 days.

(21) Appl. No.: 12/520,207

(22) PCT Filed: Dec. 20, 2007

(86) PCT No.: PCT/IB2007/055255
§ 371 (c)(1),
(2), (4) Date: Jul. 7, 2009

(87) PCT Pub. No.: WO2008/075312
PCT Pub. Date: Jun. 26, 2008

(65) Prior Publication Data
US 2010/0057886 A1    Mar. 4, 2010

Related U.S. Application Data

(60) Provisional application No. 60/876,361, filed on Dec. 20, 2006.

(51) Int. Cl.
*G06F 15/16* (2006.01)
*G06F 17/30* (2006.01)
(52) U.S. Cl. ........ 709/219; 709/203; 709/204; 707/687; 707/695
(58) Field of Classification Search .................. 709/219, 709/203, 204
See application file for complete search history.

(56) References Cited

U.S. PATENT DOCUMENTS

| | | | |
|---|---|---|---|
| 6,668,262 B1* | 12/2003 | Cook | 1/1 |
| 7,519,630 B2* | 4/2009 | Brown et al. | 1/1 |
| 2005/0210101 A1 | 9/2005 | Janik | |
| 2006/0004576 A1 | 1/2006 | Kishida | |

FOREIGN PATENT DOCUMENTS

EP    1 435 739    7/2004

OTHER PUBLICATIONS

Tesanovic, Aleksandra; et al; "COMET: A Component-Based Embedded Real-Time Database"; Technical Report, Dept. Computer Science, Linkoping University and Dept of Computer Enginnering, Malardalen Univeristy; 2002.

(Continued)

*Primary Examiner* — Jude J Jean Gilles

(57) ABSTRACT

A wireless media arrangement streams media over a local packet-based wireless network. According to an example embodiment, such a wireless media arrangement (e.g., 100) includes a digitally-encoded non-volatile storage device (NSD) (e.g., 110) such as a hard disc drive (HDD) that stores media, reloadable memory (e.g., 115) such as random-access memory (RAM), a media center (e.g. 105) to stream the stored media to a media playback device over the local network, and an embedded media server (e.g., 120). The media server wirelessly discovers and communicates with a media playback device (e.g., 125) on a local network. The media server also stores database tables on the NSD identifying the stored media. Upon startup, the media server loads a current version of the database tables into the reloadable memory; however, if an error is detected in the current version, then a pervious version of the database tables is loaded. When a change is made to the stored media, the media server stores a new version of the database tables to the NSD while maintaining a previously-stored version of the database tables to facilitate backup in the event of corruption or other error.

11 Claims, 3 Drawing Sheets

OTHER PUBLICATIONS

Graves, Steve; "in-Memory Database Systems"; Linux Journal; Sep. 1, 2002; pp. 1-6.

Garcia-Molina, Hector, et al; "Main Memory Database Systems: An Overview"; IEEE Transactions on Knowledge and Data Engineering; vol. 4, No. 6; Dec. 1992; pp. 509-516.

Camargos, Lasaro, et al; "A Primary-Backup Protocol for in-Memory Database Replication"; Proceedings of the 5TH IEEE International Symposium on Network Computing and Applications; 2006; 8 Pages.

Ortiz, Sixto Jr.; "Embedded Databases Come out of Hiding"; Industry Trends; Mar. 2000; pp. 16-19.

* cited by examiner

WIRELESS MEDIA SYSTEM WITH EMBEDDED MEDIA SERVER

FIELD OF THE INVENTION

The present invention relates generally to media storage and playback, and more particularly to wireless media devices, arrangements and approaches.

BACKGROUND

As media content has evolved in use and application, it has become desirable to be able to quickly transfer media content over a local network from one device to another in a cost effective manner. For example, a wireless network in a home can be used to transfer media content stored at a central location to other devices located throughout the house for playback. However, these types of systems are subject to the limitations of both the device that stores the media content and the device that is used for playback.

The development of a device that can store a large amount of media content (e.g., 30,000+ item database) and provide the playback devices quick access to the media content, while being relatively inexpensive has been challenging. Typically a database of this size is implemented using a database library that stores database files directly on a hard disc. However, the implementation of such a large media server database has been challenging, relative to accessing the database, particularly where the delivery of media content involves the use of relatively inexpensive or low-power devices, such as those operating relatively slow embedded processors and/or with restricted hard drive bandwidth. In many applications, query and update speeds for such a database can be undesirably slow.

These and other issues have presented challenges to the distribution of media over local networks.

SUMMARY

Various aspects of the present invention are directed to arrangements for storing and manipulating media content, and for delivering the media content over a local packet-based wireless network. The present invention is exemplified in a number of implementations and applications, some of which are summarized below.

According to an example embodiment of the present invention, a wireless media playback arrangement streams media to a media playback device such as a media renderer on a local packet-based wireless network. The arrangement includes a digitally-encoded nonvolatile storage device (NSD) that stores digital media content, reloadable memory to provide relatively fast access to data stored therein, a media center to wirelessly communicate the stored digital media content to the media playback device over the local packet-based wireless network and a dynamically-updateable embedded media server. The embedded media server wirelessly discovers and communicates with the media playback device on the local packet-based wireless network in order to stream the stored digital media content to the media playback device. The embedded media server also stores database tables identifying the stored digital media content on the NSD, and further pre-reserves space on the NSD to store the database tables. Upon startup, the embedded media server loads a current version of the database tables into the reloadable memory; however, if an error is detected in the current version, then a pervious version of the database tables is loaded into the reloadable instead. When a change is made to the stored digital media content, the embedded media server stores a new version of the database tables to the NSD identifying the stored digital media content with the change while maintaining a previously-stored version of the database tables on the NSD.

The above summary of the present invention is not intended to describe each embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
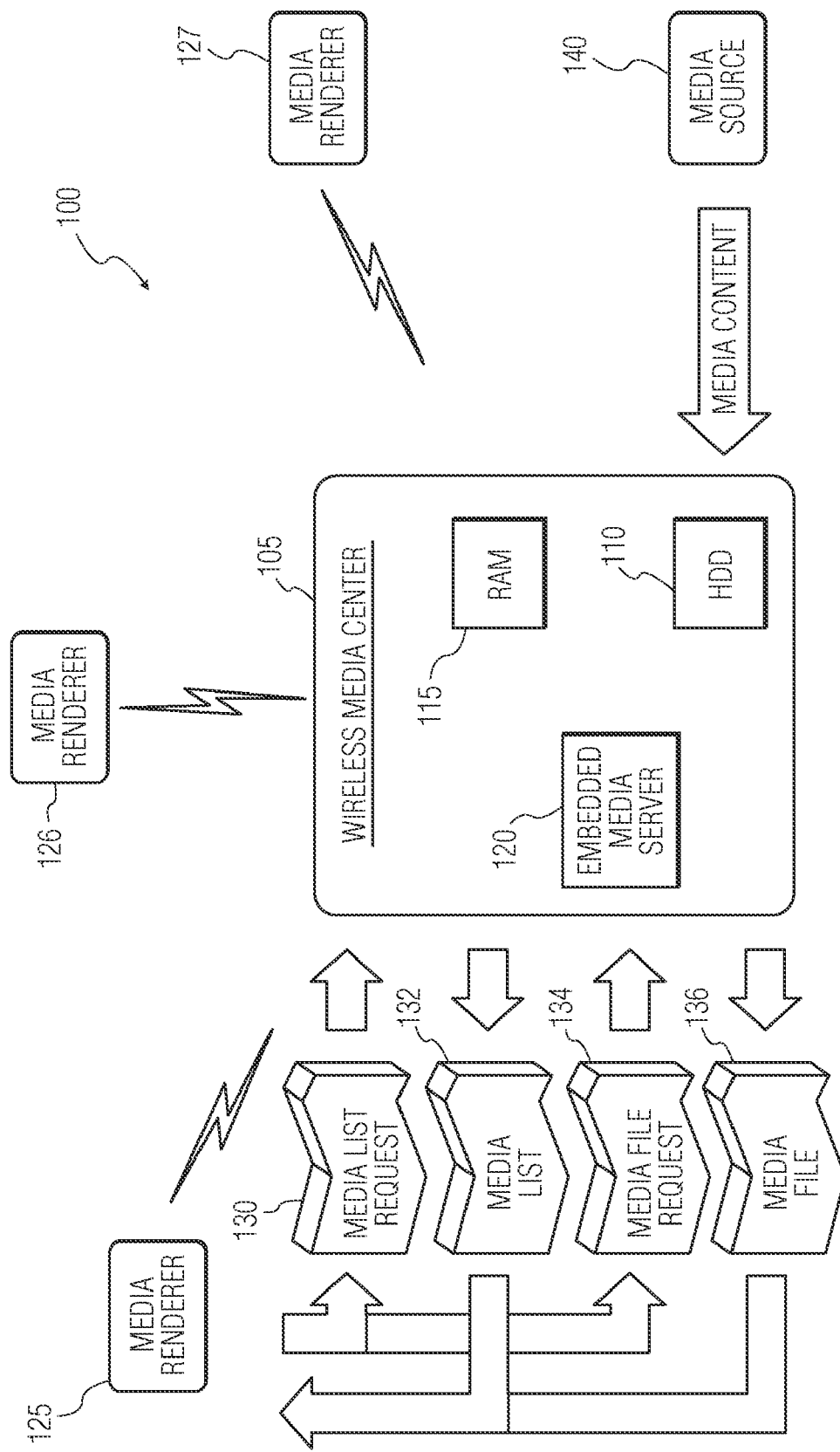
FIGS. 1A and 1B show a system for wirelessly streaming media content to media playback devices (e.g., media renderers) on a local wireless network, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including those in the appended claims.

DETAILED DESCRIPTION

The present invention is believed to be applicable to a variety of arrangements and approaches for media playback over a local network. While the present invention is not necessarily limited to such applications, an appreciation of various aspects of the invention is best gained through a discussion of examples in such an environment.

According to an example embodiment of the present invention, a wireless media playback arrangement streams media to a media playback device on a local packet-based wireless network. The arrangement includes a digitally-encoded nonvolatile storage device NSD such as a hard disc drive (HDD) that stores digital media content, and reloadable memory such as random-access memory (RAM) or a relatively high-speed FLASH memory to provide relatively fast access to data stored therein. The arrangement further includes a media center to wirelessly communicate the stored digital media content to the media playback device over the local packet-based wireless network and a dynamically-updateable embedded media server. The embedded media server wirelessly discovers (e.g., recognize as connected to a wireless network) and communicates with the media playback device on the local packet-based wireless network in order to stream the stored digital media content to the media playback device. For example, the media server streams music that is stored on the NSD to the music playback device such as a packet-based audio device for playback by a user.

The embedded media server also stores database tables identifying the stored digital media content on the NSD, and further pre-reserves space on the NSD to store the database tables. Pre-reserving space on the NSD ensures that there is space available to save the database tables. Upon startup, the embedded media server loads a current version of the database tables into the reloadable memory; however, the databases tables are subject to corruption. Therefore, the media server checks the current version for an error which indicates that the current version is corrupt; if the error is detected then the media deletes the current version and loads a pervious version of the database tables into the reloadable memory. The version of the database tables that is load into the reloadable is used by the media server to stream the stored digital media content to the media playback device.

When a change is made to the stored digital media content (e.g., new content added, content deleted, and changes to the stored content description), the embedded media server stores a new version of the database tables to the NSD identifying the stored digital media content with the change while maintaining a previously-stored version of the database tables on the NSD. Multiple versions of the database tables are saved on the hard disc in order to allow recovery in the event of database corruption.

According to another example embodiment of the present invention, a media server accesses and controls the management and distribution of a variety of stored media content. The media server accesses the content and transmits the content to another device (e.g., a media renderer) via a wireless network. The types of media content made available to the media renderer by the media server include, but are not limited to video, audio, and/or still images.

The media content is transmitted over the wireless network using a transfer protocol and data format that is understood by the media server and the media renderer. The media server supports one or multiple transfer protocols and data formats for the media content and, in certain embodiments, converts the format of a given content item (e.g., a media file) into another format for transmission to a media renderer. Examples of devices that may be implemented in connection with the media server (or as the media server) include VCRs, CD/DVD players/jukeboxes, cameras, camcorders, PCs, set-top boxes, satellite receivers, audio tape players, and other similar types of devices.

A media renderer is a device that obtains media content from the media server via a wireless network. Examples of media renderers include TVs, stereos, network-enabled speakers, mp3 players, electronic picture frames, music-controlled water fountains, and other similar types of devices. The type and format of media content that a media renderer can receive depends on the transfer protocols and data formats that it supports. Some media renderers only support one type of media content (e.g., audio or still images) or one format (e.g., audio in an mp3 format); whereas other media renderers support a wide variety of content such as video, audio and still images, and/or a variety of formats.

According to another example embodiment of the present invention, media content is identified by a database that is organized internally as a set of linked lists implemented with, for example, C++ standard template library containers. These containers reside in system reloadable memory (e.g., RAM) during normal operation but periodic saves commit them directly to the hard disc.

Figure 1B:
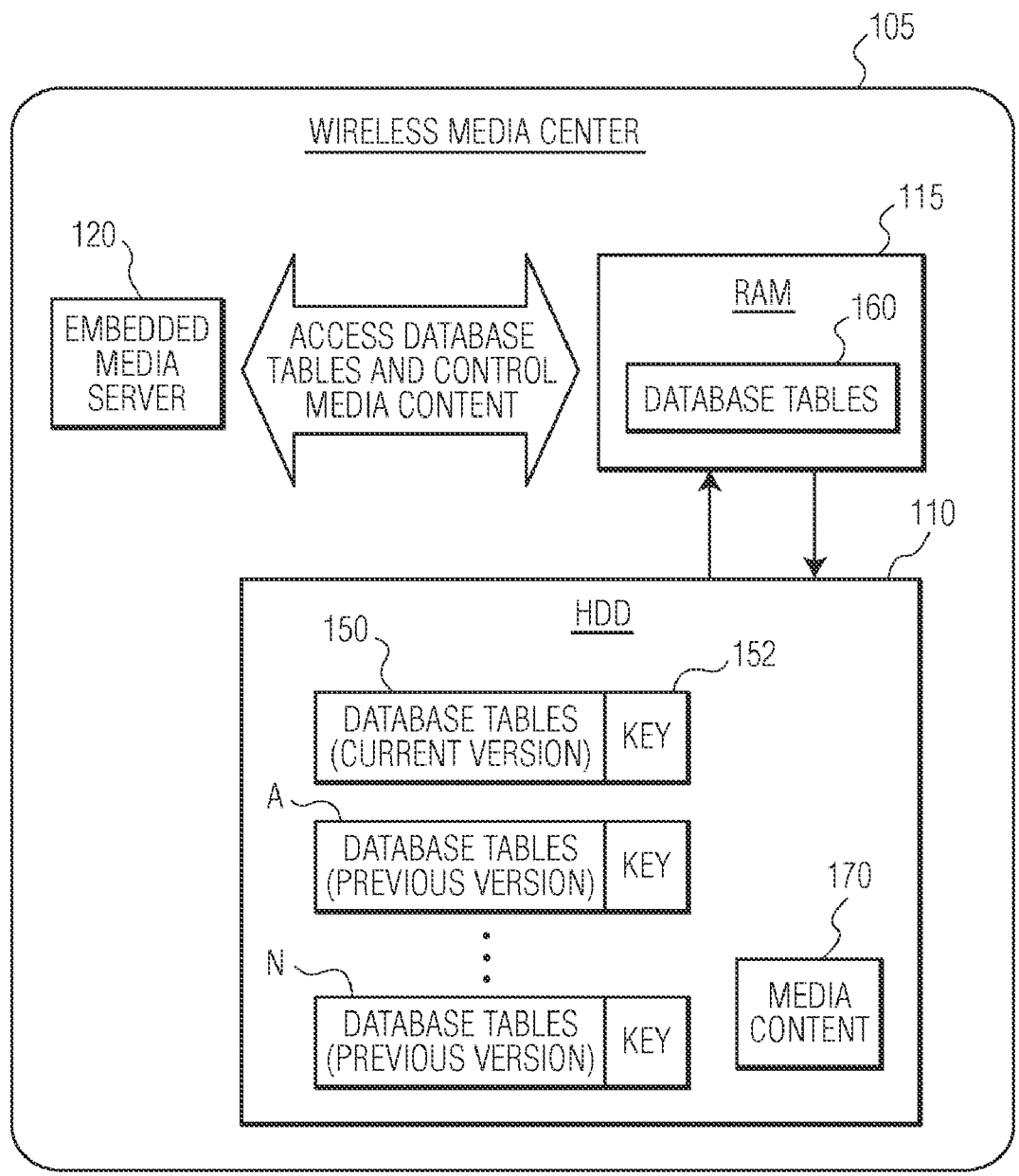

Turning now to the figures, FIGS. 1A and 1B show a system 100 for wirelessly streaming media content to media renderers 125-127 on a local packet-based wireless network according to an example embodiment of the present invention. A wireless media center 105 includes a hard disc drive (HDD) 110, random-access memory (RAM) 115 and an embedded media server 120 (e.g., embedded software implemented by a processor that carries out functions of the media center 105). FIG. 1B shows a detailed view of the wireless media center 105. The embedded media server 120 has access to media content that is stored on the hard disc 110. When the wireless media center 105 is initialized (e.g., power is turned on) the current version of the database tables 150 stored on the hard disc 110 is loaded in to the RAM 115. The media server 120 uses the version of the database tables 160 that is stored in the RAM 115 to access and control the media content 170 the is stored on the hard disc 110.

The wireless media center 105 communicates with media renderer 125 using UPnP (universal plug n play) control protocols in order to initialize and configure both devices so that the media content stored on the hard disc 110 can be transferred from the wireless media center to the media renderer. The initialization and configuration can include, for example: determining the media content to be transmitted, selecting a transfer protocol that is supported by both devices and selecting the format of the media content to transmit. The media content is then streamed from the wireless media center 105 to the media renderer 125 using the selected transfer protocol.

In the above discussion as well as that in the following regarding FIG. 1A and related embodiments, the shown media renderers 125-127 are implemented with one or more of a multitude of packet-based media playback devices such as a digital audio player, a digital video player or other media devices capable of playing back packet-based media. In this regard, the referenced media renderers may involve different functionality relative to on another and/or to media renderers implemented in the context of UPnP AV protocols (discussed further below).

In one implementation, the wireless media center 105 initiates communication with the media renderer 125. The wireless media center 105 includes a user interface and/or a display that allows a user to browse the media content that is accessible to the embedded media server 120 and to select the media content to be streamed to the media renderer 125.

In another implementation, the media renderer 125 initiates communication with the wireless media center 105. The media renderer 125 also includes a user interface and/or a display that allows a user to browse the media content that is accessible to the embedded media server 120 and select the media content to be streamed to the media renderer. The user interfaces of the media renderer 125 and/or the wireless media center 105 further allow the user to control the playback of the media content streamed by the wireless media center to the media renderer.

In the example where the media renderer 125 initiates communication, the media render sends a media list request 130 to the media server 120. The media list request 130 is a request for information about the media content that is accessible to the media server 120. The media list request 130 also includes information concerning the data formats and transfer protocols that are supported by the media renderer 125. The media server 120 responds by sending a media list 132 to the media renderer 125. The media list 132 includes information regarding the media content accessible to the media server 120, thereby allowing the media render 125 to browse the available media content. The media list request 130 further includes information concerning the available data formats for the media content and transfer protocols that are supported by the media server 120. The media renderer 125 then selects the desired media content by sending a media file request 134 to the media server 120. The media file request 134 identifies the selected media content and includes the preferred data format and transfer protocol, which are selected from those that are supported by both the media server 120 and the media renderer 125. The media server 120 responds to the media file request 134 by streaming the selected media content to the media renderer 125 as media file 136.

In a further implementation, the wireless media center 105 transfers (i.e., streams) multiple media content items to different media renderers 125-127 at the same time. A separate media stream is sent to each of the media renderers 125-127. The wireless media center 105 can use different transfer protocols for each of the media streams. For example, music in MP3 format is streamed to media renderer 125 using one transfer protocol at the same time that pictures in JPEG format are streamed to media renderer 126 using a different transfer protocol. For simplicity, the media renderers 125-127 are represented in FIG. 1 by the same icon; however, the media renderers can be various types of devices that support different media formats and transfer protocols. Also, for simplicity, FIG. 1 displays only three media renderers 125-127; notwithstanding, the wireless media center 105 is capable of streaming media content to more than three media renderers.

Figure 2:
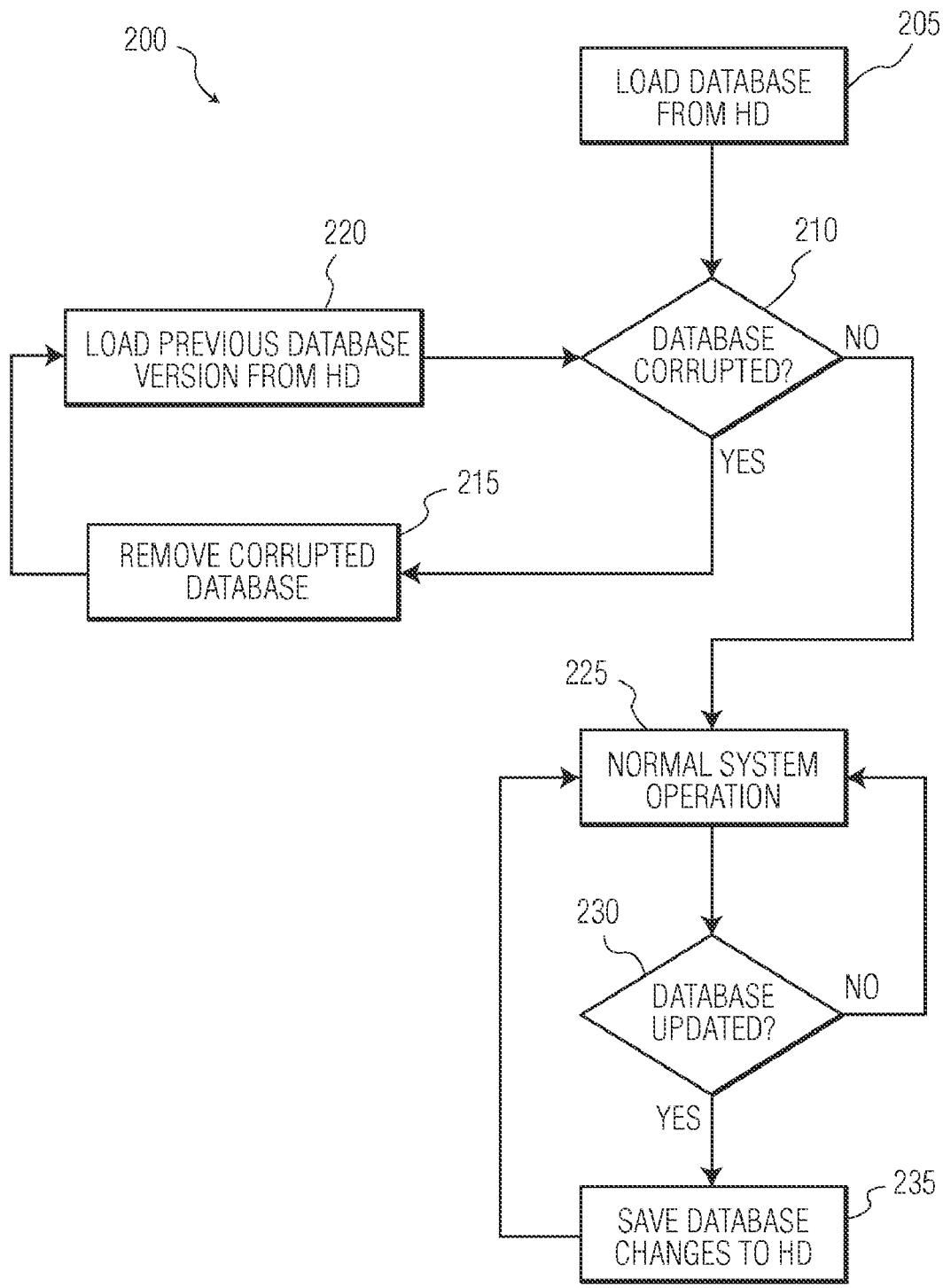
FIG. 2 shows a flow diagram of the operation of a wireless media center with an embedded media server, according to another example embodiment of the present invention.

FIG. 2 shows a flow diagram 200 depicting the operation of a wireless media center implementing a hard disc to store database tables for media content, according to another example embodiment of the present invention. At step 205, a database is loaded off of a hard disc (e.g., at system boot), and all the tables in memory are reloaded with media content from the hard disc.

At step 210, the database is checked for data corruption that may have occurred in one or more of a variety of manners. Such data corruption can occur, for example, in connection with loading the database in RAM as data is moved to and from the hard disc (e.g., if an update is being written and power is lost). The corruption check at step 210 addresses such potential sources of corruption.

If the database is determined to be corrupt at step 210, the system removes the corrupted database (i.e., the current version 150 of FIG. 1B) at step 215 and then loads the previous version (A of FIG. 1B) of the database at step 220 which is kept on the hard disc as a backup. The previous version of the database is also checked for data corruption at step 210.

If the database is not corrupt at step 210, the database is determined to be complete and the system enters normal operation at step 225. During normal operation, the system periodically checks for updates or changes that have been made to the database at step 230. For example, new media content being stored to the hard disc from a media source (e.g., media source 140 of FIG. 1A). If a change has been made, then a new version of the database is saved to the hard disc at step 235. In one implementation, a new version of the database is saved to the hard disk after a predetermined number of changes have been made to the stored media content. When the new version of the database is saved to the hard disc the previous version of the database is not overwritten (e.g., essentially a queue of older database folders is maintained on the hard disc, A-N of FIG. 1B). When the newest version of the database is found to be corrupt (step 210) at file load time, that version of the database is removed (step 215) and the database is loaded from the next database folder back in the queue (step 220). A database folder naming convention is used to indicate the head and tail of the database folder queue, therefore no actual head and tail pointers need to be written to the hard disc thereby avoiding the possibility of the pointers being corrupted. Saving older versions of the database prevents problems (e.g., power failure or file system corruption) from causing all database entries to be lost. However, any updates to the database that occurred after the last successful database save will be lost.

Referring back to step 210, data corruption is checked using one or more of a variety of approaches. In one implementation, the database is checked at step 210 in accordance with an indicator stored during a previous database save. For example, when a database is saved to the hard disc for every file written to the hard disc, the total number of records in that file is stored in its header, and an end of file marker is written to each file. When the database is loaded from the hard disc, records are read back from each file until the total number of records in the header is recovered. After the total number of records is recovered, the end marker is checked at step 210; if the end marker is not found then the file is determined to be corrupt.

In another implementation, a validation key (e.g., 152 of FIG. 1B) is used to mitigate or prevent data corruption. Generally, a saved database takes the form of a folder on the hard disc that contains a number of individual files representing tables or other parts of the database content. As this set of files will take a finite amount of time to write to the hard disc, a problem (e.g., a power failure) can occur which may prevent all of the files from being written thus leaving the directory in an incomplete state. The validation key is an empty file that is the last to be written to the hard disc (i.e., the validation key is written after all other files have been written, such that the presence of the validation key can be used to verify that all files have been properly written). When a database is loaded from a directory first the presence of the validation key is checked. If the validation key is found, then all of the other database files were written to the directory. If the validation key is not found then the directory is declared invalid.

In another example embodiment of the present invention, a media server shares a hard disc with other applications that also consume hard disc space (e.g., as with the media server 120 of system 100 in FIG. 1 where the hard disc is used to store the media content and the database identifying the media content). The media server mitigates issues relevant to the possibility of there being an insufficient amount of free space available on the hard disc to store the database tables. In one implementation, the media server reserves all the database space in accordance with an expected need (e.g., for a 30,000 track database with significant metadata characterizing the data) the first time the system runs to ensure enough hard disc space is available for saving the database. For example, the media server reserves space by creating templates for its files and folders on the hard disc at an expected size of the files (e.g., an estimated or known maximum size). Subsequent changes to the stored media content are saved by overwriting the existing files and in this regard, because the files are not deleted, they reserve all of the space for the database irrespective of how much hard disc space is used by the other applications. In one implementation, space is also reserved on the hard drive to store the media content identified by a complete database the first time the system runs.

In another example embodiment of the present invention, three versions of the database tables are saved on the hard disk, a current version and two backups. All of the space needed for the three versions is reserved in accordance with an expected need (e.g., for a 30,000 track database with significant metadata characterizing the data) the first time the system runs to ensure enough hard disc space is available for saving the database versions. When a new version of the database tables is saved to the hard disk the oldest backup version is overwritten. Reserving space for multiple versions of the database tables ensures that there will be space available on the hard disc to save the new version while also saving previous versions of the database to protect against data corruption.

In a further example embodiment of the present invention, the database tables include frequently used data, while rarely used data is stored on the hard disc. For example, the database tables include metadata (e.g., artist, album, track name) that is used to select a media content item, whereas other information that is less likely to be accessed need not be loaded into RAM as part of the database tables.

As discussed above, the various approaches and arrangements described herein may be implemented in connection with a variety of media systems, including those implementing universal plug and play (UPnP) approaches to serving and providing media for playback at one or more local devices. In many applications, the arrangements described herein are implemented with a UPnP approach non inconsistent with that described with the UPnP AV Architecture: 0.83, dated Jun. 12, 2002, which us available from the UPnP Forum. In some example embodiments, a wireless media playback arrangement is implemented in connection with a Wireless Audio Center such as the WAC700, WACS700 and WAC7000 available from Phillips Electronics of New York, N.Y.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

The invention claimed is:

1. A wireless media playback arrangement for streaming media to a media playback device on a local packet-based wireless network, the arrangement comprising:
   a digitally-encoded non-volatile storage device (NSD) to store digital media content;
   a reloadable memory to provide relatively fast access to data stored therein;
   a media center to wirelessly communicate the stored digital media content to the media playback device over the local packet-based wireless network; and
   a dynamically-updateable embedded media server adapted to
      wirelessly discover and communicate with the media playback device on the local packet-based wireless network,
      store database tables identifying the stored digital media content on the NSD,
      pre-reserve space on the NSD to store the database tables,
      upon startup, in response to detecting an error in a current version of the database tables, load a previous version of the database tables into the reloadable memory, and in response to not detecting an error, load the current version of the database tables into the reloadable memory, and
      in response to a change in the stored digital media content, store a new version of the database tables to the NSD identifying the stored digital media content with the change while maintaining a previously-stored version of the database tables on the NSD.

2. The arrangement of claim 1, wherein the dynamically-updatable embedded media server is further adapted to pre-reserve all of the NSD space required to store database tables for a complete database upon a first initialization of the embedded media server.

3. The arrangement of claim 2, wherein the dynamically-updatable embedded media server is further adapted to pre-reserve all of the NSD space required to store digital media content identified by the complete database.

4. The arrangement of claim 1, wherein the dynamically-updateable embedded media server detects a presence of a validation key to determine which version of the database tables to load into the reloadable memory.

5. The arrangement of claim 1, wherein the dynamically-updateable embedded media server is further adapted to write a validation key to the NSD that is a last file written when the embedded media server stores the new version of the database tables to the NSD.

6. The arrangement of claim 5, wherein the validation key is an empty file.

7. The arrangement of claim 1, wherein the dynamically-updateable embedded media server is further adapted to store the new version of the database tables to the NSD in response to a predetermined number of changes in the stored digital media content.

8. The arrangement of claim 1, wherein the database tables include frequently used data that identifies the stored digital media content and rarely used data that identifies the stored digital media content is stored on the NSD.

9. The arrangement of claim 1, wherein the dynamically-updateable embedded media server is further adapted to compare metadata in the version of the database tables loaded in to the reloadable memory to metadata stored on the NSD to ensure database consistency.

10. A wireless media playback arrangement for streaming media to a media playback device on a local packet-based wireless network, the arrangement comprising:
    means for storing digital media content;
    reloadable memory to provide relatively fast access to data stored therein;
    means for wirelessly communicating the stored digital media content to the media playback device over the local packet-based wireless network; and
    means for wirelessly discovering and communicating with the media playback device on the local packet-based wireless network,
    means for storing database tables identifying the stored digital media content,
    means for pre-reserving space to store the database tables,
    means, response to detecting an error in a current version of the database tables upon startup, for loading a previous version of the database tables into the reloadable memory, and in response to not detecting an error, for loading the current version of the database tables into the reloadable memory, and
    responsive to a change in the stored digital media content, means for storing a new version of the database tables identifying the stored digital media content with the change while maintaining a previously-stored version of the database tables.

11. A method for streaming media from a dynamically-updateable embedded media server to a media playback device on a local packet-based wireless network, the method comprising:
    storing digital media content on a digitally-encoded non-volatile storage device;
    storing database tables identifying the digital media content on the NSD,
    loading current version of the database tables into reloadable memory that provides relatively fast access to data stored therein;

checking the current version of the database tables for an error;

in response to detecting an error, deleting the current version of the database tables and loading a previous version of the database tables into the reloadable memory;

discovering and communicating with the media playback device on the local packet-based wireless network;

using the version of the database tables loaded in the reloadable memory, streaming the stored digital media content to the media playback device over the local packet-based wireless network; and in response to a change in the stored digital media content, storing a new version of the database tables to the NSD identifying the stored digital media content with the change while maintaining a previously-stored version of the database tables on the NSD.

* * * * *